C

(12) United States Patent
Bai et al.

(10) Patent No.: US 8,239,245 B2
(45) Date of Patent: Aug. 7, 2012

(54) METHOD AND APPARATUS FOR END-TO-END RETAIL STORE SITE OPTIMIZATION

(75) Inventors: Xin Xin Bai, Beijing (CN); Jin Dong, Beijing (CN); Ta-Hsin Li, Danbury, CT (US); Wen Jun Yin, Beijing (CN); Bin Zhang, Beijing (CN); Cindy Q. Zhang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 12/017,673

(22) Filed: Jan. 22, 2008

(65) Prior Publication Data

US 2009/0187464 A1 Jul. 23, 2009

(51) Int. Cl.
*G06Q 30/00* (2012.01)
*G06Q 40/00* (2012.01)
*G06Q 10/00* (2012.01)

(52) U.S. Cl. ............... 705/7.37; 705/7.11; 705/7.29; 705/7.31; 705/7.33; 705/7.34; 705/7.35; 705/7.36

(58) Field of Classification Search .............. 705/10
See application file for complete search history.

(56) References Cited

U.S. PATENT DOCUMENTS

| 7,302,410 | B1 | 11/2007 | Venkatraman et al. | |
|---|---|---|---|---|
| 7,440,903 | B2 | 10/2008 | Riley et al. | |
| 7,752,067 | B2 | 7/2010 | Fotteler et al. | |
| 7,895,067 | B2 | 2/2011 | Ramakrishnan | |
| 7,937,286 | B2 | 5/2011 | Newman et al. | |
| 8,010,399 | B1 | 8/2011 | Bruce et al. | |
| 2002/0087384 | A1* | 7/2002 | Neifeld | 705/10 |
| 2003/0033195 | A1* | 2/2003 | Bruce et al. | 705/10 |
| 2003/0055707 | A1* | 3/2003 | Busche et al. | 705/10 |
| 2004/0044578 | A1* | 3/2004 | Kim et al. | 705/15 |
| 2004/0098296 | A1 | 5/2004 | Bamberg et al. | |
| 2005/0108070 | A1 | 5/2005 | Kelly et al. | |
| 2006/0069606 | A1 | 3/2006 | Kaczkowski et al. | |
| 2007/0027745 | A1* | 2/2007 | Ouimet | 705/10 |
| 2008/0294996 | A1* | 11/2008 | Hunt et al. | 715/739 |
| 2009/0012803 | A1 | 1/2009 | Bishop et al. | |

OTHER PUBLICATIONS

Ghosh, Avijit; Craig, C Samuel. FRANSYS: a franchise distribution system location model. (retail network optimization model). Journal of Retailing , v67 , n4 , p. 466(32). 1991.*
U.S. Office Action mailed Oct. 11, 2011 in related U.S. Appl. No. 12/117,540.

* cited by examiner

*Primary Examiner* — R. David Rines
*Assistant Examiner* — Richard Scheunemann
(74) *Attorney, Agent, or Firm* — Scully, Scott, Murphy & Presser, P.C.; Daniel P. Morris, Esq.

(57) ABSTRACT

A method and apparatus for end-to-end retail store one-stop site configuration integrates multiple data sources, identifying key customers, forecasting merchandise demand. Site configuration is formulated as a mathematical optimization problem with both in-store and external data as input to the problem whose solution provides proper suggestions for retail store transformation.

19 Claims, 9 Drawing Sheets

METHOD AND APPARATUS FOR END-TO-END RETAIL STORE SITE OPTIMIZATION

FIELD OF THE INVENTION

The present application is related generally to optimization and analytics and more particularly, to a method and apparatus for providing retail store site optimization.

BACKGROUND OF THE INVENTION

Stores are considered important but costly channels for many retailers to win in the customer-centric marketplace. Properly diagnosing and configuring the stores strategically throughout geographic locations is a critical issue for retailers to address, especially in competitive markets with frequent mergers and acquisitions, fragmented customer expectations, and city environment changes. Retail store site configuration poses a complex decision-making process involving strategic store diagnosis and analysis, and requires consideration of many dependant factors including in-store data such as sales metrics, transactions, member information, and like, and external data such as geographic and demographic data in the trade area. Retail store site configuration also poses a complex analysis problem, including considering opening or reconfiguring the right stores with the right format, capacity and merchandise mix in the right location to serve the right customers. Therefore, a methodology and a tool that provide an effective and efficient retail store site configuration are desirable.

BRIEF SUMMARY OF THE INVENTION

A method and system for configuring store site are provided. The method in one aspect may comprise integrating in-store and external data from multiple sources into a geographic information system platform and determining customer segment profile, customer geo-distribution and customer demand from the integrated data in the geographic information system platform. The method may further include modeling and forecasting potential customer geo-distribution using said customer segment profile, said customer geo-distribution and said customer demand and modeling and forecasting potential merchandise demand using said potential customer geo-distribution. The method may also include deriving one or more gaps using said forecasted potential customer geo-distribution or forecasted potential merchandise demand or combination of both and determining site configuration based on said one or more gaps. The site configuration provides recommendations based on location, format, capacity, merchandise mix and customer segment.

A system for providing store site configuration, in one aspect, may comprise data integration module operable to integrate in-store and external data from multiple sources into a geographic information system platform and customer analytics module operable to determine customer segment profile, customer geo-distribution and customer demand from the integrated data in the geographic information system platform. The customer analytics module may be further operable to model and forecast potential customer geo-distribution using said customer segment profile, said customer geo-distribution and said customer demand, and to model and forecast potential merchandise demand using said potential customer geo-distribution. A gap analysis module is operable to derive one or more gaps using said forecasted potential customer geo-distribution or forecasted potential merchandise demand or combination of both. A configuration decision module is operable to determine site configuration based on said one or more gaps, said site configuration providing recommendations based on location, format, capacity, merchandise mix and customer segment.

A program storage device readable by a machine, tangibly embodying a program of instructions executable by the machine to perform the above method steps may be also provided.

Further features as well as the structure and operation of various embodiments are described in detail below with reference to the accompanying drawings. In the drawings, like reference numbers indicate identical or functionally similar elements.

DETAILED DESCRIPTION

A method and apparatus are provided for end-to-end retail store, one-stop site configuration. The method and apparatus in one embodiment integrates multiple data sources, identifies key customers, forecasts merchandise demand, and proposes proper suggestions for retail store transformation. The suggestions in one embodiment are obtained from a mathematical optimization problem that is modeled based on both in-store and external data.

In one embodiment, a unified model is used to provide a site configuration (also referred to as a store configuration), which includes store location, format, capacity, merchandise mix and customer for store site network with existing and new store. The method and system of the present disclosure integrates and analyzes both in-store and external data from different sources. Using both in-store and external data from different sources provides for a more reliable decision-making. In one embodiment, in-store and external data are formatted and integrated in GIS (geographic information system) platform. In-store and external integrated analysis of the present disclosure can provide comprehensive views, including actual performance and potential demand, which makes the store site network decision-making more reliable.

The system and method of the present disclosure in one embodiment regards a customer as the driving source of store sales and provides customer-centric analytics: connecting and analyzing multiple source data through customer analysis, analyzing historical data of sales and transactions associated with customer profile, modeling and forecasting potential customer from current customers, transactions and external data, modeling and forecasting the merchandise demand from geographic-customer-merchandise mapping model.

Figure 1:
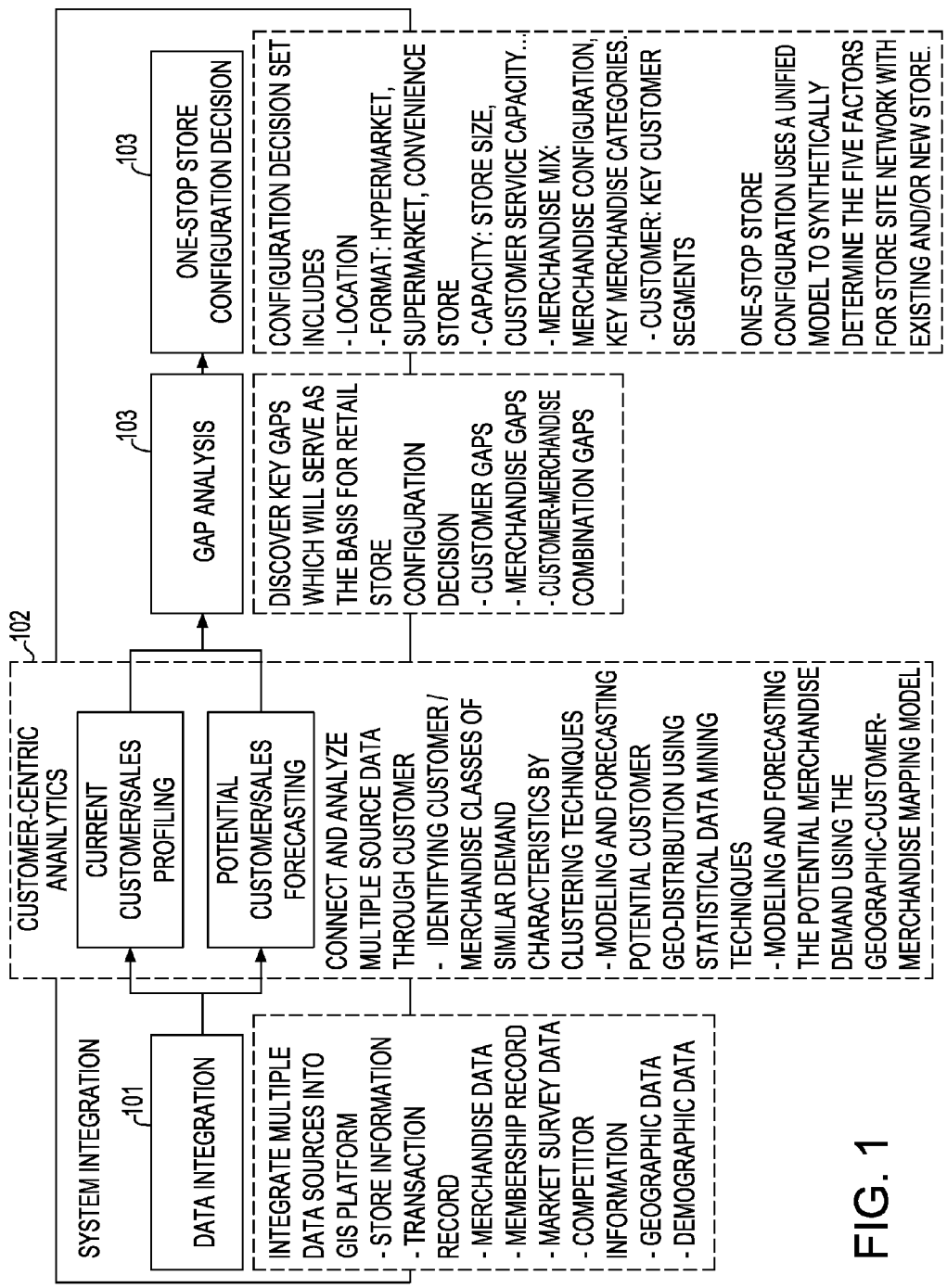
FIG. 1 shows the overview of an embodiment of the end-to-end retail store site optimization system of the present disclosure.

In one embodiment, the system of end-to-end retail store site optimization may include the following modules: data integration, customer-centric analytics, gap analysis and one-stop store configuration decision. FIG. 1 illustrates an overview of the system including those modules. Data Integration module 101 integrates multiple data sources, for instance, to support more reliable decision-making. As an example, both in-store data and external data are integrated into GIS platform and analyzed together. In customer-centric analytics 102, a customer is regarded as the driving source of store sales in retail industry. By integrating and analyzing the multiple sources data, customer-centric analytics module 102 provides comprehensive description of customers, for example, that include customer segment profile, customer geo-distribution, and customer demand. Customer profile, for example, may include the age, gender, income of customers, etc. Examples of customer geo-distribution may include the geographic positions of customers, where the customers are located. Examples of customer demand may include the demands of different customer segments, e.g., the demand of young female customers may include dresses, while that of older male customers may include cigarettes.

GAP Analysis module 103 computes the gaps between potential demand and actual sales in each facility. In one embodiment, three types of gaps are derived based on the potential C-M demand and the actual C-M (customer-merchandise) demand in each facility: Gap between the number of potential customer and the number of actual customer in each customer class; Gap between the potential demand and the actual sales of each merchandise category, which can be derived from the potential C-M demand and the actual C-M demand; and Gap between the potential C-M demand and the actual C-M demand.

In one embodiment of the present disclosure, retail store configuration decision set includes five factors: location, format, capacity, merchandising and customer. One-stop Store Configuration Decision Module 104 uses a unified optimization model to synthetically configure (that is, configuring the five factors simultaneously in one optimization mode) the five factors for following scenarios: configure existing store in store network only with existing stores; configure new store in store network only with existing stores; configure both existing store and new store in store network only with existing stores; configure existing store in store network with new store; configure new store in store network with new store; configure both existing store and new store in store network with new store; configure new store when no existing store.

Configuring an existing store in store network only with existing stores utilizes the data of all existing stores and configures, for example, the five factors of those existing stores. An example of this scenario is changing the merchandise mix of one existing store.

Configuring a new store in store network only with existing stores employs the data of all existing stores, does not change the five factors of existing stores, but only determines the five factors for opening new stores. An example scenario is selecting a new location for opening a new store.

Configuring both existing store and new store in store network only with all existing stores uses the data of existing stores, and configures the five factors of existing stores and determines the five factors for opening new stores. It aims to maximize the total profit of the store network including both new stores and existing stores.

Configuring an existing store in store network with new store utilizes the data of some existing stores, but no data of other recently opened stores (new stores), configures the five factors of those existing stores which have data.

Configuring a new store in store network with new store uses the data of some existing stores, but no data of other recently opened stores (new stores), and determines the five factors for the new opened stores, but does not change the existing stores, which have data.

Configuring both existing store and new store in store network with new store uses the data of some existing stores, but no data of other recently opened stores (new stores), and determines the five factors for the new opened stores, but also changes the five factors of existing stores which have data. Traditionally, known methodologies use different optimization models for different scenarios. In the system and method of the present disclosure, the above and other scenarios can be handled in one unified optimization model.

Figure 2:
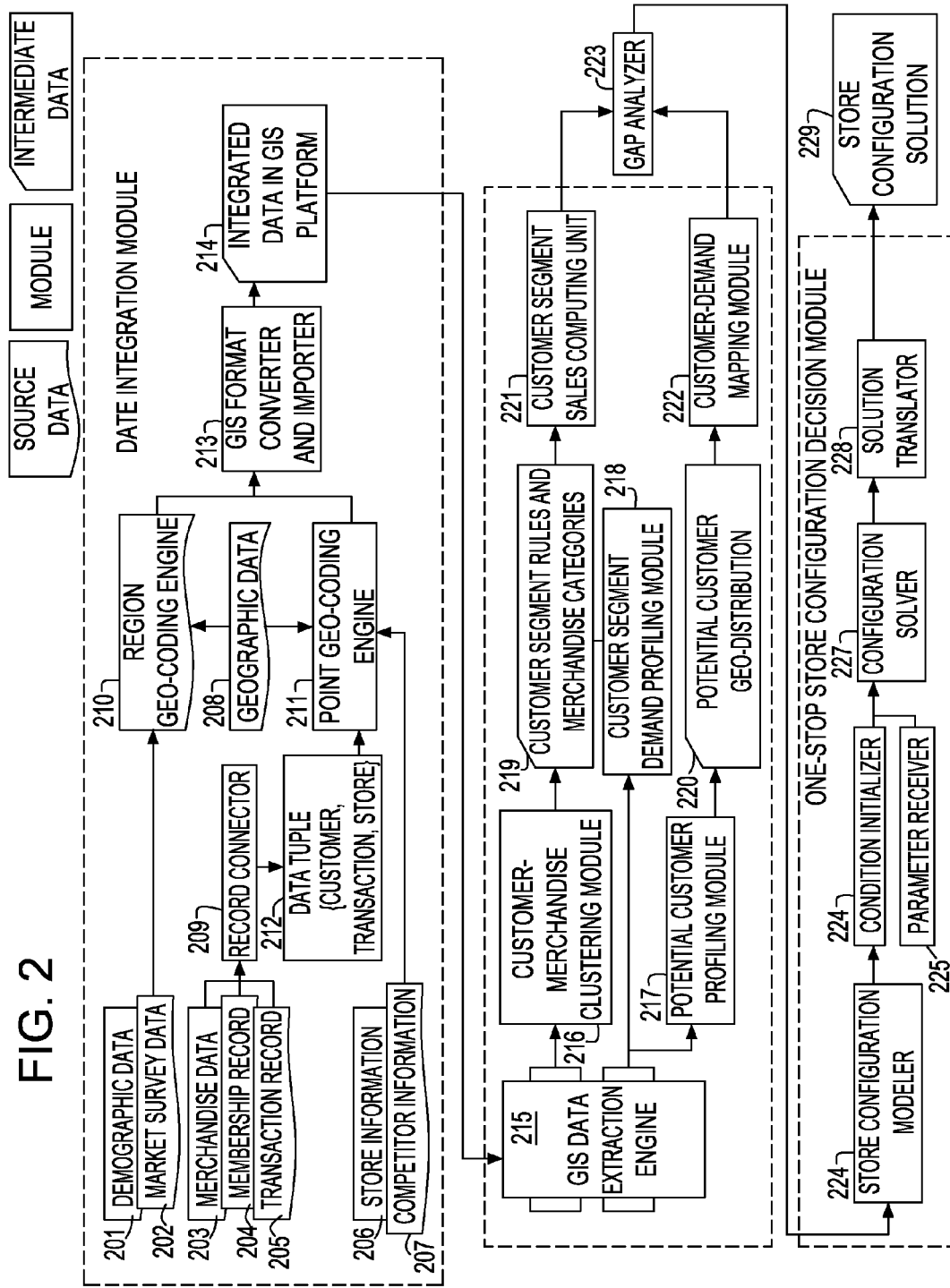
FIG. 2 shows an exemplary embodiment of the system and methodology of the present disclosure.

FIG. 2 describes detailed components used in the modules of FIG. 1, and data flows among the modules in one embodiment of present disclosure. Examples of data sources may include: in-store data such as Merchandise Data 203, Membership Record 204, Transaction Record 205, store information 206; and external data such as Geographic data 208, Demographic data 201, Market Survey data 202, Competitor Information 207.

Record Connector 209 associates Merchandise data 203 and Transaction Record 205 through Membership Record 204, and produces Data Tuples 212. Data tuples provide information as to who buys what in which store.

Data sources, which are typically input in text format, are also converted to GIS format or like. For example, an original data entry may include the data associated with a store and, for instance, the address of the store location. Original data entries associated with geographic data 208 are geo-coded into GIS format, for example, so that an entry is converted to data associated with a position in a digital map. For instance, Point Geo-coding Engine 211 geo-codes the data with point addresses, e.g., the positions of companies, hotels, hospitals, office buildings, etc. Since those facilities typically are not large in size, those facilities are represented as "points" on the satellite images. "Industrial districts", on the other hand, may be represented on the satellite image as a region, and Region Geo-coding Engine 210 geo-codes the data with region addresses, e.g., "industrial district".

Figure 4:
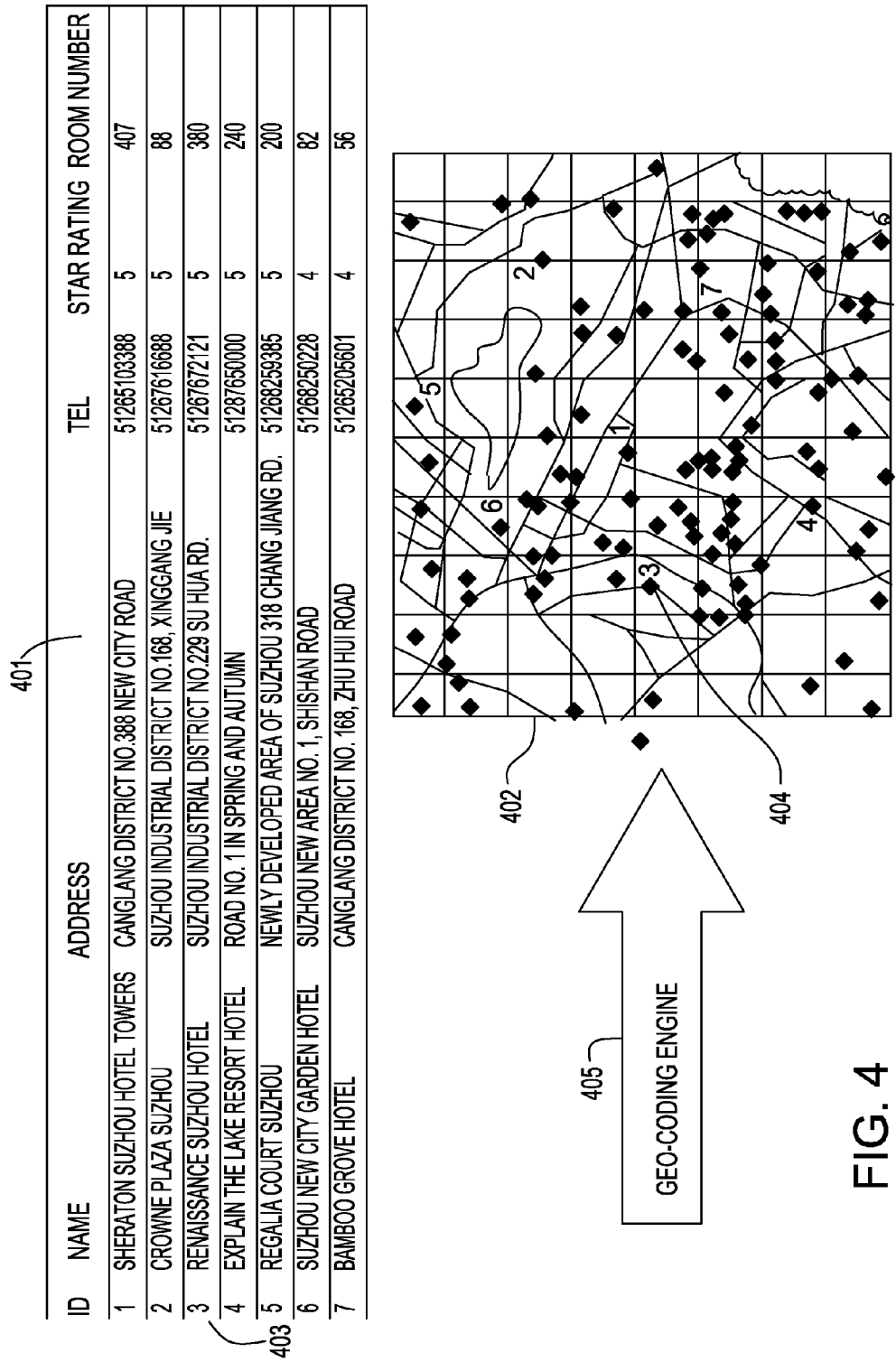
FIG. 4 shows an exemplary source hotel data in text format and the geo-coded hotel data in GIS format.

FIG. 4 shows an example hotel data in text format 401. After the geo-coding process shown at 405, the text hotel data is converted into GIS format 402. The third entry 403 for example in the text entry 401 is geo-coded into a point shown at 404 in the GIS map 402.

Referring to FIG. 2, GIS format converter & importer module 213 converts and imports the data sources and integrates them in GIS platform 214. In one embodiment, each type of GIS data is organized in a layer or table, and those layers or tables are stored in spatial database. Each item has two parts of attributes: spatial attribute and non-spatial attributes. Spatial attribute is the position of this item on the GIS map, and non-spatial attributes include other information associated with this item, for example, name, population number, revenue, etc. Items can be queried by non-spatial attributes, for example, finding the items (e.g., residential points) whose population number is larger than 1000, or companies whose employee number are larger than 100, etc. Using a GIS platform engine, items also can be queried by their spatial relation, for example, finding items located inside a circle area of 1,000-meter radius.

By integrating multiple sources of data into GIS platform 214, both in-store and external data have the mutual characteristics that each entry in the multiple sources can be connected to a point or region with geographic position. For example, merchandise is connected to a customer with geographic position (e.g., the customer's home address) through a transaction. Thus, relationship can be established among "merchandise", customer", "transaction" and "geographic data". A transaction may include the customer ID and the purchased merchandises. A "customer" attribute may include the customer ID and position (e.g., the residential building of his home). The "geographic data" may include the positions of all residential buildings. Thus, in one embodiment, a transaction can connect merchandise with a customer whose position (address) can also be located on the GIS map by "geographic data". Converting the above-described data to GIS format and integrating to GIS platform can improve the data exploitation; for example, improve the connection process and data analysis easier. Also, items can be associated by their spatial relation and GIS platform engine can support query operations based on such spatial relations. GIS map can visualizes multiple sources of data such as in-store transaction data.

GIS Data Extraction Engine 215 extracts data from the integrated data 214 and supplies the data to other components of the system. In one embodiment, it is developed based on GIS platform, and can produce packaged data in predefined data model by leveraging functions or interfaces of GIS platform including spatial query operation of GIS engine, another benefit of using GIS platform.

Customer-Merchandise Clustering Module 216 groups all the customer members into several classes, each class having similar demand characteristics. An example of a class having similar demand characteristics may be a customer segment of a specific gender in a specific age with similar purchasing demands. The input data model may include three parts: customer member ID, customer member profile (age, income, gender, geo-position), and the amounts of every merchandise category (e.g., meat, bread, soft drink, wine, etc) purchased by the customer member in one period (e.g., one year, or half year). Clustering technology (e.g., K-means) is performed to generate the customer classes in terms of customer profile and category purchased amounts 219. The customer segment profile may include the range (e.g., age range) of the customer profiles in the customer class.

Customer Segment Demand Profiling Module 218 estimates purchasing demand of each customer segment. For example, in each customer segment, the purchasing amounts of each category of every customer are sorted in descending order, and one statistical value (e.g., median value) can be selected as the purchasing demand for the merchandise category from the customer segment.

Potential Customer Profiling Module 217 estimates Geo-distribution (i.e., geographic positions) of potential customers 220. Data Extract Engine 215 provides the population number of each facility in the area, and the customer members in the facility by spatial query operation. This information, for instance, was integrated from the source demographic data 210. The people who are in this facility are considered as potential customers, and they belong to the customer classes that are the same as the customer members in the facility. Thus, the population numbers of every customer class in the facility can be obtained. Similarly, Potential Customer Profiling Module 217 processes the facilities one by one, estimates the potential customers of all facilities in the area, and produces the geo-distribution of potential customers 220.

Customer-Demand Mapping Module 222 converts the geo-distribution of potential customers 220 to potential merchandise category demand using the purchasing demand of each customer segment to each category obtained in Customer Segment Demand Profiling Module 218. If a facility contains n1 people of customer class 1 and the purchasing amount of customer class 1 to category 1 is m1, then the potential demand of customer class 1 to category 1 is n1*m1. That is, if there is n1 number of class 1 customers, and if each customer of class 1 demands m1 number of category 1 merchandise, then the potential demand of customer in class 1 to category 1 merchandise is n1 multiplied by m1. Other customer classes and merchandise categories are computed in the same manner. Thus, in each facility, the potential demand of one customer class to one merchandise category (potential C-M demand) can be estimated.

Customer Segment Sales Computing Unit 221 computes the actual sales of each merchandise category for each customer class in each facility. Data Extract Engine 215 provides the customer members with their transactions in each facility. For each facility, Customer Segment Sales Computing Unit 221 groups or catalogs customer members in the same customer class and sums their purchasing amounts by merchandise category. Thus, in each facility, the actual sales of one customer class to one merchandise category (actual C-M sales) can be computed.

GAP analyzer 223 (also shown as GAP Analysis module 103 in FIG. 1) computes the gaps between potential demand and actual sales in each facility. In one embodiment, three types of gaps are derived based on the potential C-M demand and the actual C-M demand in each facility: Gap between the number of potential customer and the number of actual customer in each customer class; Gap between the potential demand and the actual sales of each merchandise category, which can be derived from the potential C-M demand and the actual C-M demand; and Gap between the potential C-M demand and the actual C-M demand.

In one embodiment of the present disclosure, retail store configuration decision set includes five factors: location, format, capacity, merchandising and customer. One-stop Store Configuration Decision Module (FIG. 1 104) uses a unified optimization model to synthetically configure the five factors for following scenarios: configure existing store in store network only with existing stores; configure new store in store network only with existing stores; configure both existing store and new store in store network only with existing stores; configure existing store in store network with new store; configure new store in store network with new store; configure both existing store and new store in store network with new store; configure new store when no existing store.

Store Configuration Modeler 224 sets up an optimization model to configure the store based on the gap data. An exemplary model is described as follows. The store configuration decision is performed in the store network in this area, so the optimization variable is a set of store configurations: $\{S_i=(L_i, F_i, P_i, M_i, C_i)=1, 2, \ldots, N\}$, where $S_i=(L_i, F_i, P_i, M_i, C_i)$ is the configuration of i-th store, and N is the total number of stores including new stores and existing stores which need reconfiguration. $L_i$ is the location or position of i-th store. $F_i$ is the format of i-th store, which for example can be {hypermarket, supermarket, convenience store, etc.}. $P_i$ is the capacity of i-th store, which can be described by store size, e.g., 6000 square meters. $M_i=(n_1, n_2, \ldots, n_M)$ is the recommended target merchandise of each category in i-th store. $C_i=(b_1, b_2, \ldots, b_K)$ is the recommended target customer classes of i-th store.

The optimization objective is to maximize the total profit of the store network:

$$\max \sum_{i=1}^{N} \{P(S_i) - V_i - L(S_i, S_{i0})\}$$

$P(S_i)$ is the potential demand of i-th store with the configuration $S_i$. It is determined by the all above five factors and the geo-distribution of potential C-M demand:

$$P(S_i) = \sum_{g \in TA(L_i, F_i, P_i)} \sum_{k \in C_i} \sum_{j \in M_i} D(g, b_k, n_j)$$

where $D(g, b_k, n_j)$ is the potential demand of merchandise category j from customer class k in facility g. In a facility g, the potential demand is the total of potential demand of all target customer classes and target categories. $TA(L_i, F_i, P_i)$ is the trade area of i-th store, i.e., the area where customers can go to the store. It is determined by store location, format, and capacity. The most-used trade area is disk-like area. Its center is determined by $L_i$, the radius is determined by format $F_i$, and the "thickness" (total customer capacity) is determined by $P_i$. The total potential demand of i-th store is the total demand of all facilities in the trade area of the store. $V_i$ is the existing sales volume of i-th store, and it is zero for a new store. It can be easily calculated from the transactions in the store.

$L(S_i, S_{i0})$ is the operation cost of transforming i-th store's existing configuration $S_{i0}$ to recommended configuration $S_i$. If i-th store is a new store, then $S_{i0}$=null, and $L(S_i, S_{i0})$ is the cost only for opening a new store. Otherwise, $L(S_i, S_{i0})$ comprises the cost of both closing the existing store and opening the new store. If location does not change, then $L(S_i, S_{i0})$ equals the cost of changing to other configurations. $S_i$ is the function of $L_i$, $F_i$, $P_i$ and $M_i$, and $S_i$ becomes larger when the four factors are larger. The function can be pre-defined empirically by a mapping table.

Thus, the store network configuration problem can be a maximum coverage location optimization problem (MCLP), which can be solved by Configuration Solver 227.

Condition Initializer 226 and Parameter Receiver 225 preset the configuration scenario and initial parameters. The Condition Initializer 226 defines which existing stores need reconfiguration, and how many new stores can be opened. The Parameter Receiver 225 guides user to input the mapping function from $L_i$, $F_i$, $P_i$ and M, to $S_i$.

When the scenario and parameters are ready, Configuration Solver 227 produces results for the optimization model. The optimization may be solved as a maximum coverage location problem, using any one of many global optimization algorithms (e.g., Genetic Algorithm, Greedy Algorithm, etc.) or like. To solve maximum coverage location problem, the algorithm should try all possible candidates and then find the most optimal one as the final solution. However, the trying process costs much time. To speed up the process, the number of possible candidates should be reduced, so as to reduce the number of trying. The set of possible candidates is referred to as "candidate search space", so, heuristics should be used to reduce the "candidate search space" to speed up the solving process. For example, a heuristic considers the optimized locations in an arbitrary facility or any point besides the streets, so the candidate search space can be highly reduced.

Solution Translator 228 translates the mathematical results into retail store configuration suggestions, saves the result in a layer in GIS format, and renders the solution onto the GIS platform.

Figure 3:
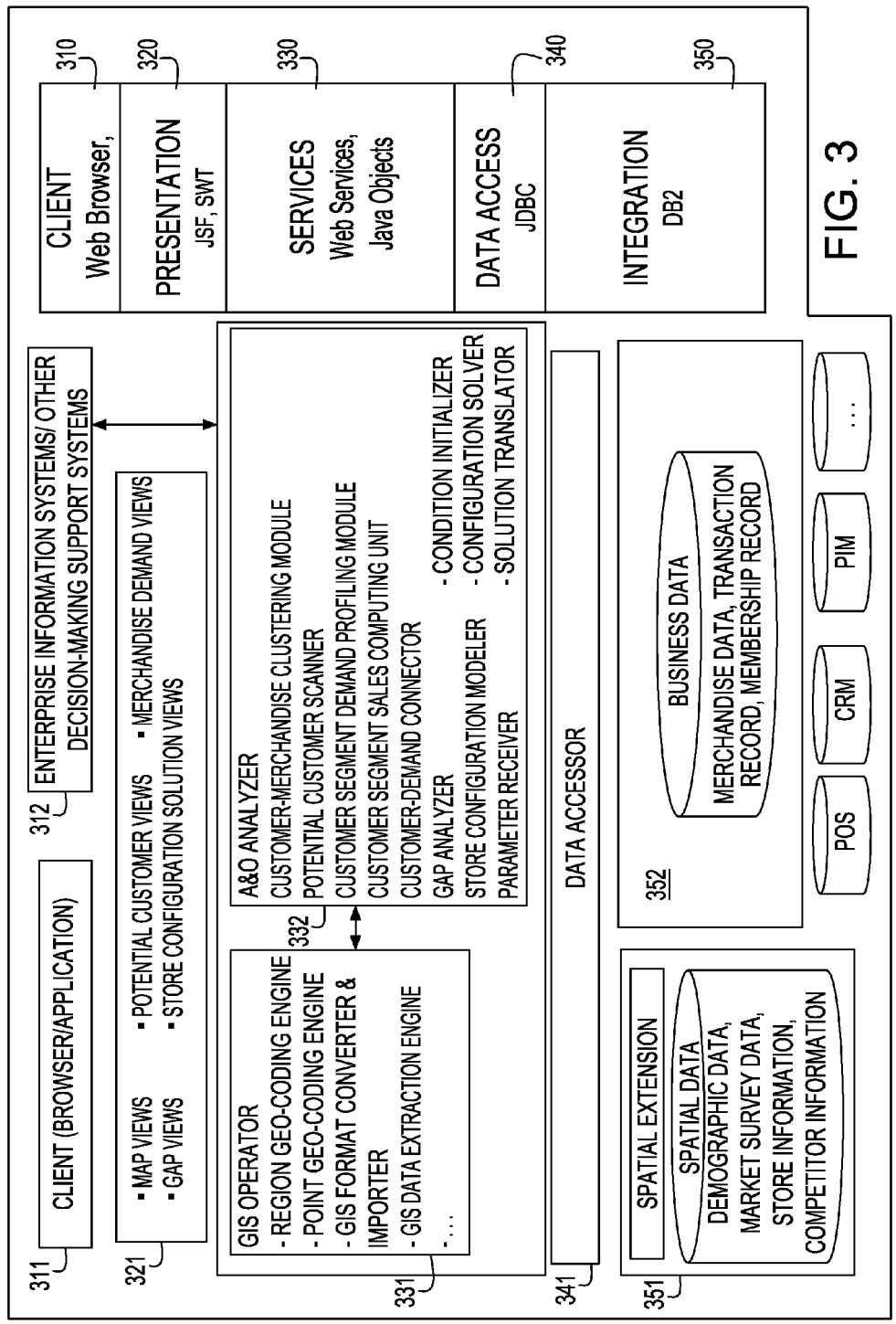
FIG. 3 shows the software architecture of a system of the present disclosure in one embodiment.

FIG. 3 shows software architecture of the system of the present disclosure in one embodiment. The architecture comprises five layers: Client (310), Presentation (320), Service (330), Data Access (340), and Integration (350). Client (310) layer is the application clients, including Client (Browser, or application) 311, and Enterprise Information System 312. Presentation (320) layer may include the basic views 321 including Map views, Potential Customer views, merchandise demand views, GAP views, and store configuration solution views. Services (330) layer may include two major parts: GIS operator (331) including the basic GIS related operations, and A&O analyzer (332) including the analytics & optimization components. Data Access (340) layer is the data accessor component (341) which handles the database operations. Integration (350) layer integrates multiple sources of data, which can be stored, for example, in two databases: Spatial database (351) and Business database (352).

Figure 5:
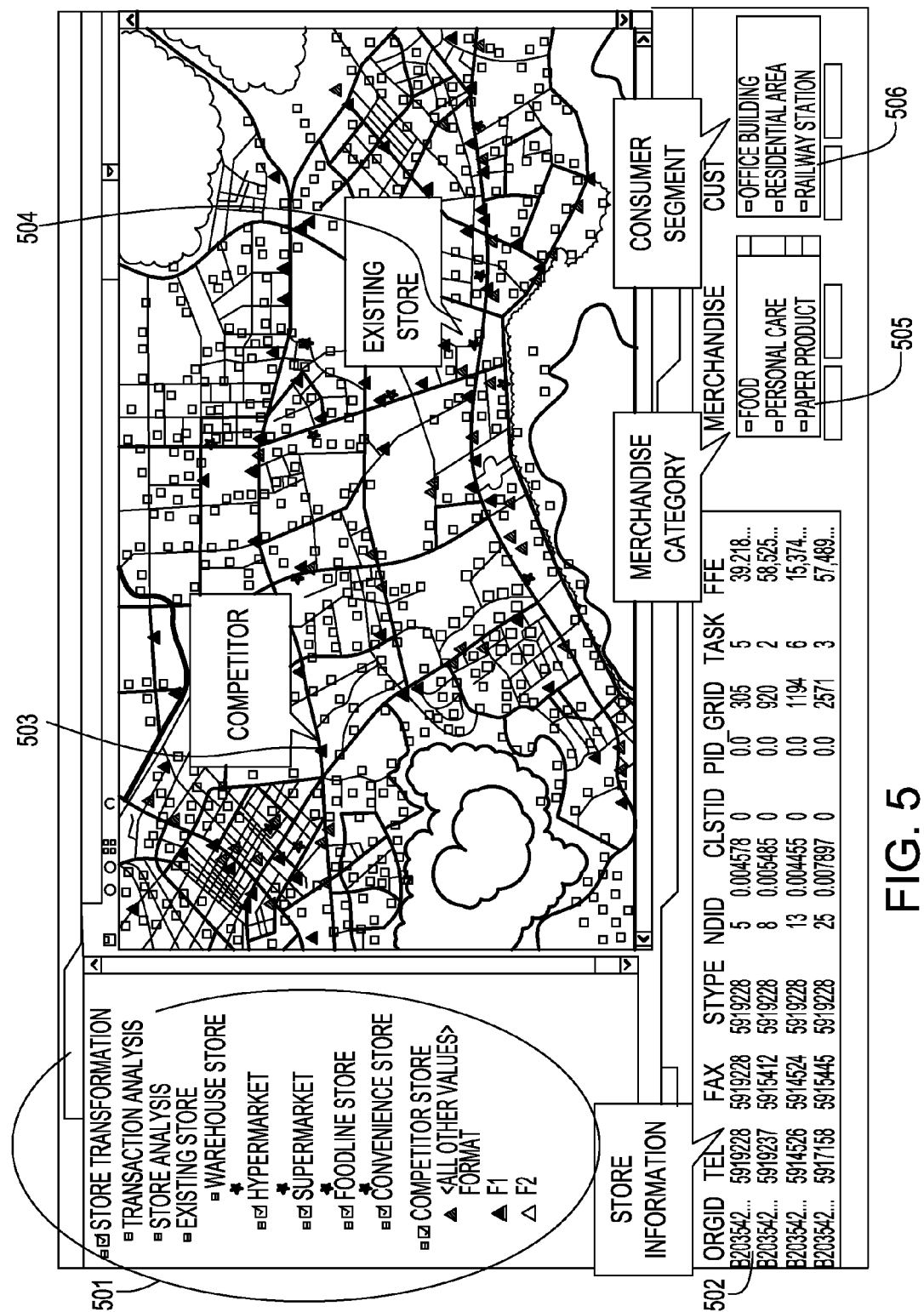
FIG. 5 shows an exemplary integrated data organized by layers in GIS format.

FIGS. 5-9 illustrate examples of visual outputs presented to a user. FIG. 5 shows an example of integrated data in GIS platform. The multiple sources of data are organized in layers 501 in one embodiment. A window, a view or like, may show a GIS map and, for example, display an existing store 504 and a competitor 503. Data can be queried from another window, for example, from store information 502, merchandise category 505 and/or the pre-defined customer classes 506 windows, views or like, and displayed.

Figure 6:
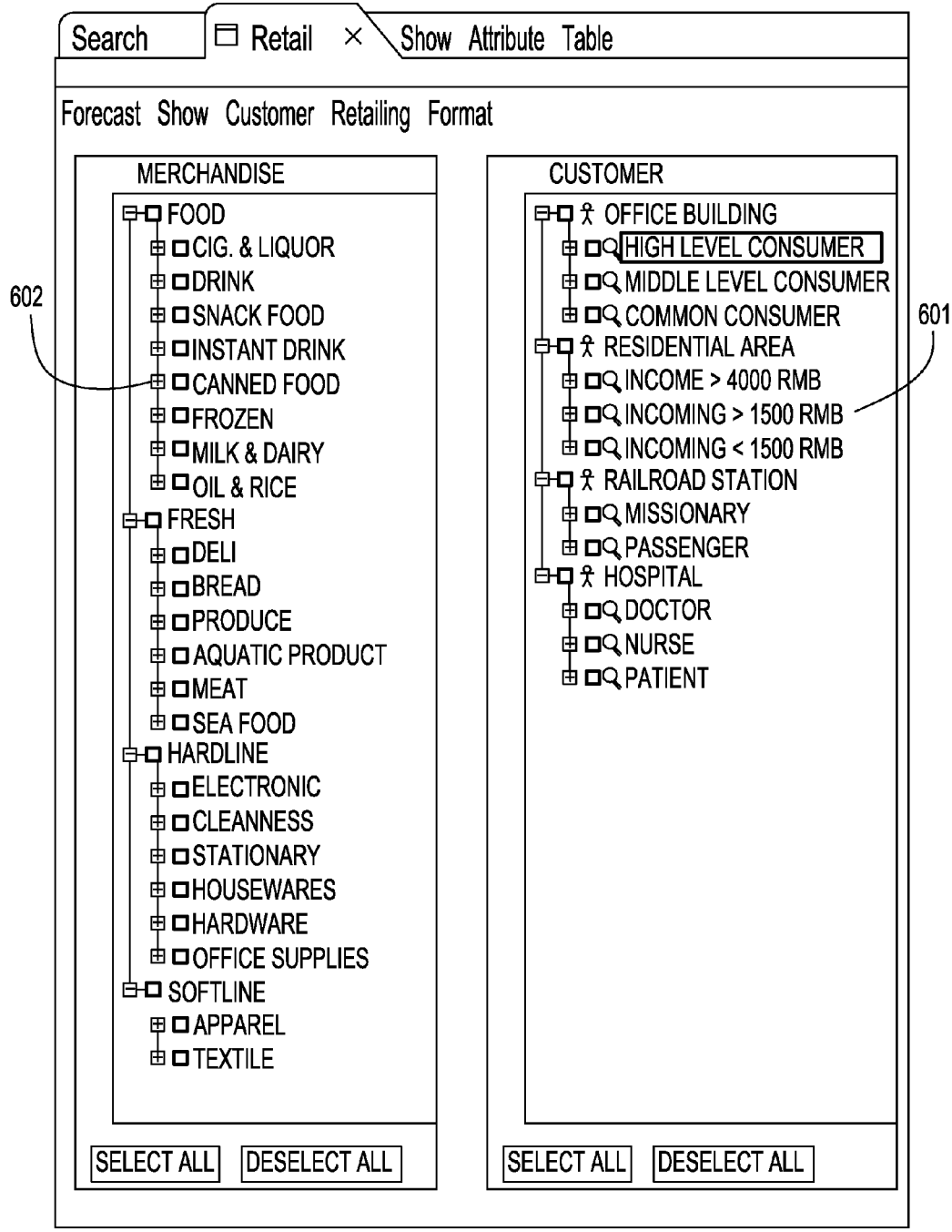
FIG. 6 shows examples of customer classes and merchandise categories in one embodiment of the present disclosure.
Figure 7:
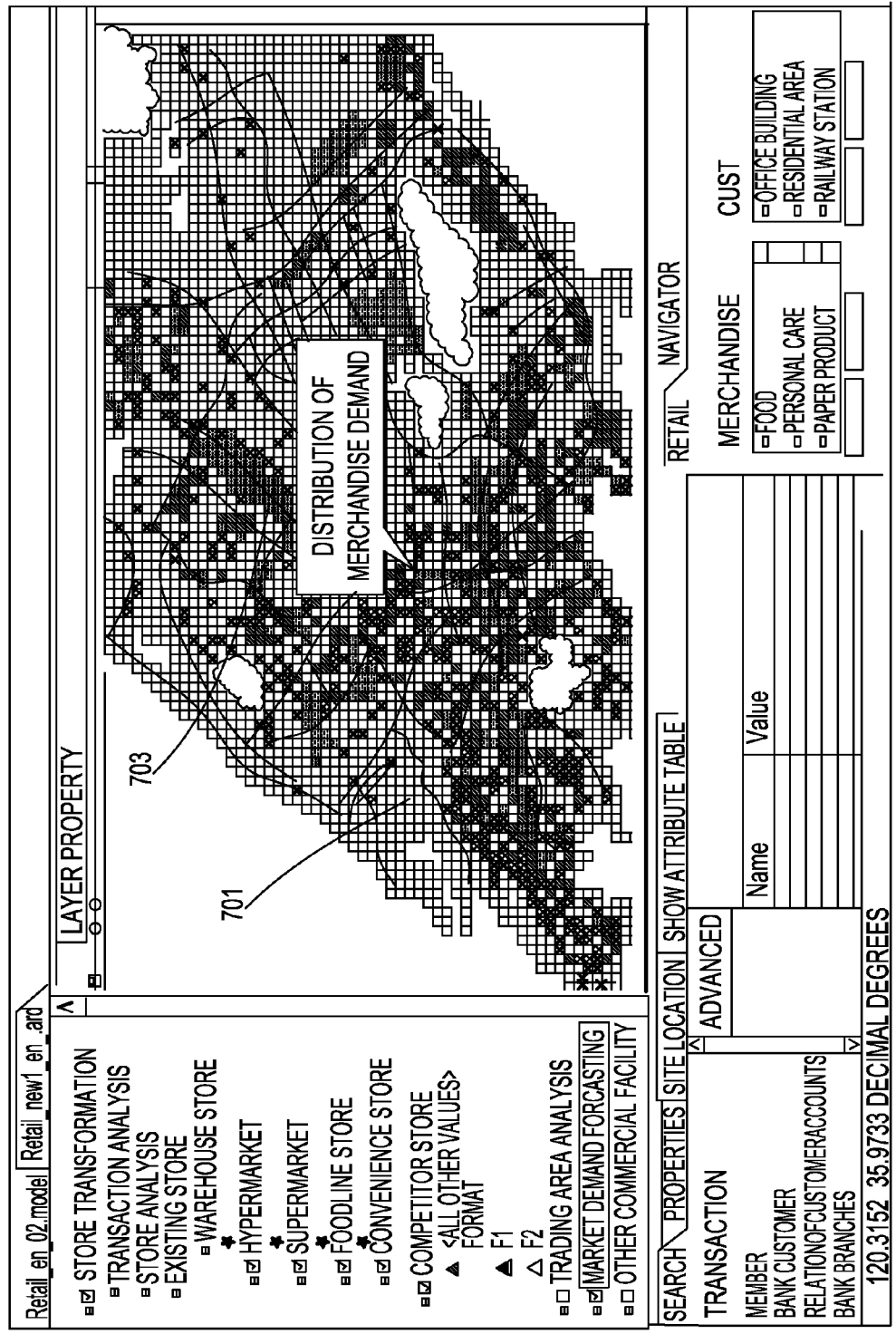
FIG. 7 shows an exemplary total potential demand of all customers to all categories in each grid area.

FIG. 6 shows an example of customer classes and merchandise categories. In FIG. 6, a window 601 shows a description of customer classes, and a window 602 lists merchandise categories. Using the interface in FIG. 6, users can select the customer classes and merchandise categories which are interesting and will be involved in consequent analysis. In FIG. 7, the upper-right window shows a potential demand of all customers to all categories in grid areas. The whole area is partitioned into a large amount of grids 703, and the total potential demand is computed and colored in each grid. Red color grids 703 have higher total potential demand, and yellow color grids 701 have lower total potential demand.

Figure 8:
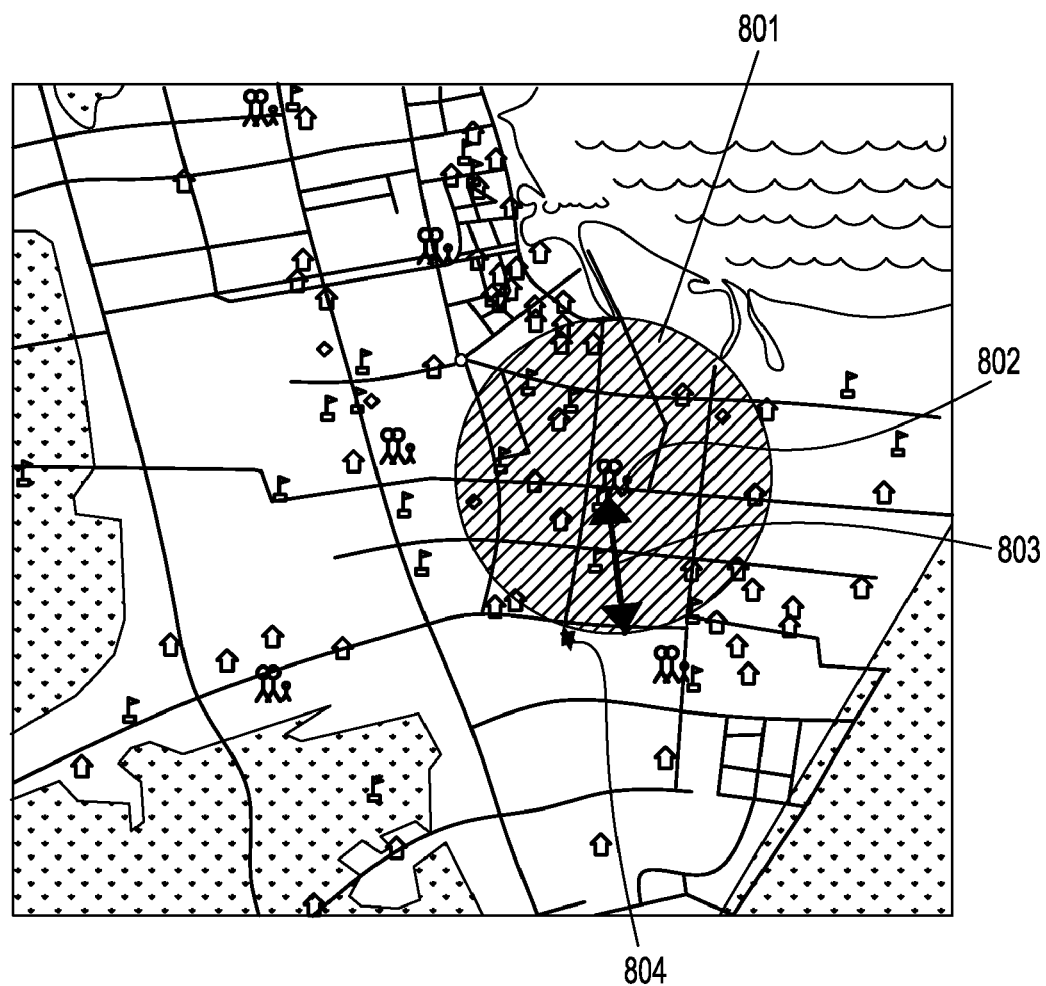
FIG. 8 shows an exemplary trade area of a store.

FIG. 8 shows an example of trade area of a store. The blue disk 801 is the trade area. Its location 802, radius 803 and "thickness" 804 are separately decided by store location, format and capacity. The trade area center 801 may be determined by the store location, the radius 803 may be determined by store format, and the "thickness" 804 may be determined by store capacity.

Figure 9:
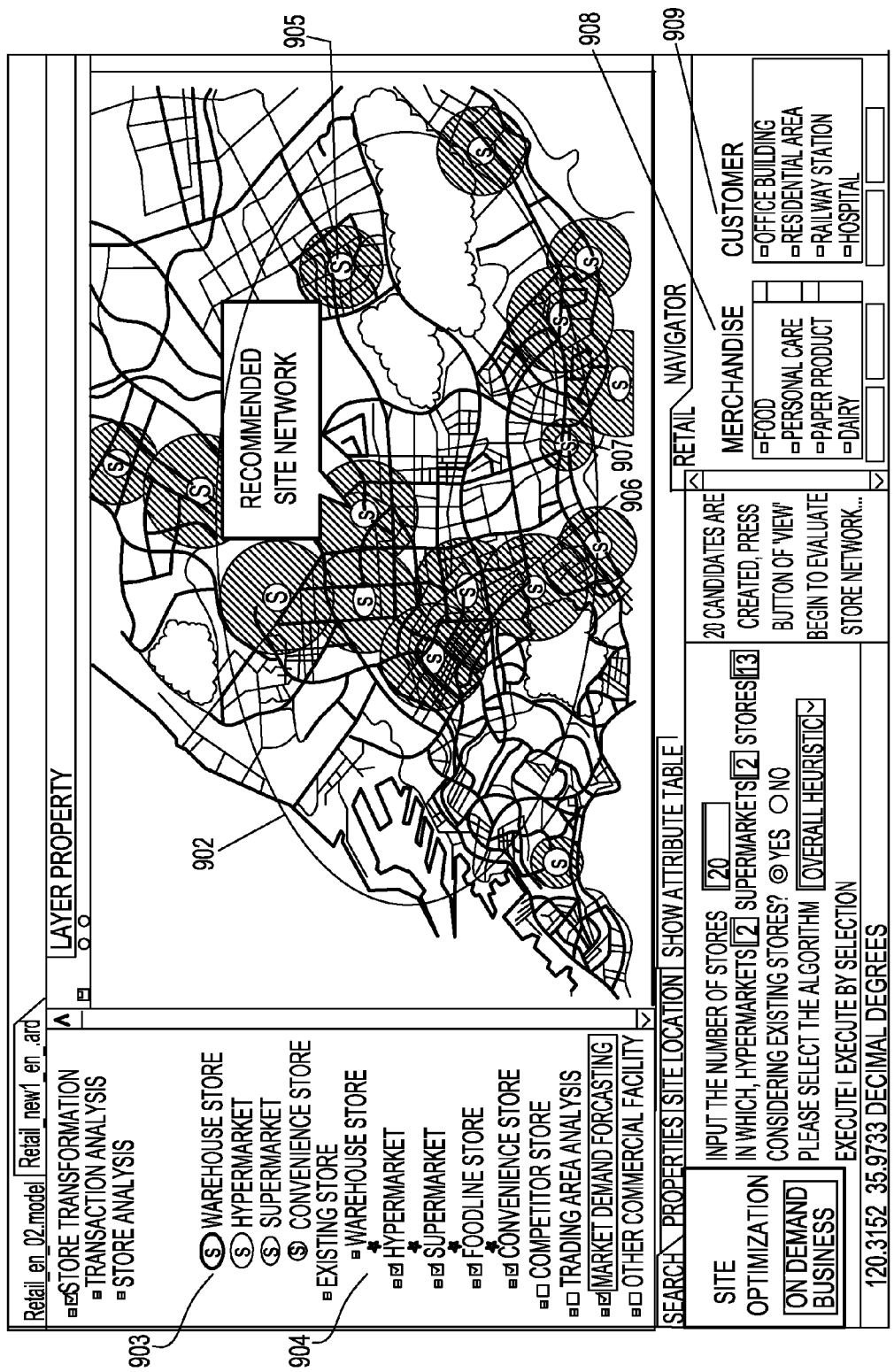
FIG. 9 shows an exemplary translated store network configuration.

FIG. 9 shows an exemplary translated store network configuration. 902 shows the reconfigured store network including the store location 905, store format 907, store capacity 906, target merchandise categories 908, and the target customer classes 909. For example, the three factors of a store: location, format and capacity may be indicated by a disk-like area. The center of the disk indicates the location, the radius of the disk indicates the format, larger format with larger radius, and the thickness (from 0-100%) of the disk indicates the capacity, larger capacity with larger thickness. The new stores 903 and existing stores 904 are configured in the same process. At 901, Condition Initializer 226 and Parameter Receiver 225 input the scenario and parameters.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of providing store site configuration, comprising:
    integrating in-store and external data from multiple sources into a geographic information system platform;
    determining customer segment profile, customer geo-distribution and customer demand from the integrated data in the geographic information system platform;
    modeling and forecasting potential customer geo-distribution using said customer segment profile, said customer geo-distribution and said customer demand;
    modeling and forecasting potential merchandise demand using said potential customer geo-distribution;
    deriving one or more gaps using said forecasted potential customer geo-distribution or forecasted potential merchandise demand or combination of both; and
    determining, by a processor, site configuration for a network of stores based on said one or more gaps, said site configuration providing recommendations for location, format, capacity, merchandise mix and customer segment by solving an optimization model that simultaneously determines said location, format, capacity, merchandise mix and customer segment,
        the optimization model including $$\max \sum_{i=1}^{N} \{P(S_i) - V_i - L(S_t, S_{i0})\},$$

wherein $P(S_i)$ is a potential demand of i-th store with configuration $S_i$ and wherein $$P(S_i) = \sum_{g \in TA(L_i, F_i, P_i)} \sum_{k \in C_i} \sum_{j \in M_i} D(g, b_k, n_j),$$

$D(g, b_k, n_j)$ is a potential demand of merchandise category j from customer class k in facility g,
$TA(L_i, F_i, P_i)$ is a trade area of i-th store, wherein $L_i$ is radius of the trade area determined by format $F_i$, and $P_i$ is total customer capacity,
$V_i$ is an existing sales volume of i-th store, and zero for a new store,
$L(S_i, S_{i0})$ is an operation cost of transforming i-th store's existing configuration $S_{i0}$ to recommended configuration $S_i$.

2. The method of claim 1, wherein said one or more gaps include:
    gap between the number of potential customers and actual customers.

3. The method of claim 1, wherein said one or more gaps include:
    gap between potential demand and actual sales of merchandise.

4. The method of claim 1, wherein said one or more gaps include:
    gap between potential demand of merchandise by customer segment and actual demand of merchandise by customer segment.

5. The method of claim 1, wherein said in-store and external data from multiple sources include:
    store information, transaction record, merchandise data, membership record, market survey data, competitor information, geographic data, or demographic data, or combinations thereof.

6. The method of claim 1, wherein the step of determining customer segment profile, customer geo-distribution and customer demand includes using a clustering algorithm to determine customer segment profile, customer geo-distribution and customer demand.

7. The method of claim 1, wherein the step of modeling and forecasting potential customer geo-distribution includes using statistical data mining algorithm to model and forecast potential customer geo-distribution.

8. The method of claim 1, wherein the step of determining site configuration includes building an optimization model to configure one or more stores based on said one or more gaps.

9. The method of claim 8, wherein the optimization model maximizes total profit of said one or more stores in a store network, the optimization model based on location, format, capacity, merchandise mix and customer segment factors.

10. The method of claim 1, further including:
    presenting the determined site configuration using a geographical map.

11. The method of claim 1, wherein the step of integrating further includes:
    converting said data into geographic information system format.

12. The method of claim 1, wherein said integrated data is represented with spatial attributes and non-spatial attributes.

13. A system for providing store site configuration, comprising:
    a processor;
    data integration module operable to integrate in-store and external data from multiple sources into a geographic information system platform;
    customer analytics module operable to determine customer segment profile, customer geo-distribution and customer demand from the integrated data in the geographic information system platform, the customer analytics module further operable to model and forecast potential customer geo-distribution using said customer segment profile, said customer geo-distribution and said customer demand, and to model and forecast potential merchandise demand using said potential customer geo-distribution;
    gap analysis module operable to derive one or more gaps using said forecasted potential customer geo-distribution or forecasted potential merchandise demand or combination of both; and configuration decision module operable execute on the processor and to determine site configuration for a network of stores based on said one or more gaps, said site configuration providing recommendations for location, format, capacity, merchandise mix and customer segment by solving an optimization model that simultaneously determines said location, format, capacity, merchandise mix and customer segment the optimization model including $$\max \sum_{i=1}^{N} \{P(S_i) - V_i - L(S_t, S_{i0})\},$$

wherein $P(S_i)$ is a potential demand of i-th store with configuration $S_i$ and wherein $$P(S_i) = \sum_{g \in TA(L_i, F_i, P_i)} \sum_{k \in C_i} \sum_{j \in M_i} D(g, b_k, n_j),$$

$D(g, b_k, n_j)$ is a potential demand of merchandise category j from customer class k in facility g, $TA(L_i, F_i, P_i)$ is a trade area of i-th store, wherein $L_i$ is radius of the trade area determined by format $F_i$ and $P_i$ is total customer capacity, $V_i$ is an existing sales volume of i-th store, and zero for a new store, $L(S_i, S_{i0})$ is an operation cost of transforming i-th store's existing configuration $S_{i0}$ to recommended configuration $S_i$.

14. The system of claim 13, wherein said one or more gaps include:
gap between the number of potential customers and actual customers;
gap between potential demand and actual sales of merchandise;
gap between potential demand of merchandise by customer segment and actual demand of merchandise by customer segment; or
combinations thereof.

15. The system of claim 13, wherein said in-store and external data from multiple sources include:
store information, transaction record, merchandise data, membership record, market survey data, competitor information, geographic data, or demographic data, or combinations thereof.

16. The system of claim 13, wherein the configuration decision module includes an optimization model operable to configure one or more stores based on said one or more gaps, the optimization model further operable to maximizes total profit of said one or more stores in a store network, the optimization model based on location, format, capacity, merchandise mix and customer segment factors.

17. The system of claim 13, further including:
a graphical user interface operable to present the determined site configuration using a geographical map.

18. A program storage device readable by a machine, tangibly embodying a program of instructions executable by the machine to perform a method of providing store site configuration, comprising:
integrating in-store and external data from multiple sources into a geographic information system platform;
determining customer segment profile, customer geo-distribution and customer demand from the integrated data in the geographic information system platform;
modeling and forecasting potential customer geo-distribution using said customer segment profile, said customer geo-distribution and said customer demand; modeling and forecasting potential merchandise demand using said potential customer geo-distribution;
deriving one or more gaps using said forecasted potential customer geo-distribution or forecasted potential merchandise demand or combination of both; and
determining site configuration for a network of stores based on said one or more gaps, said site configuration providing recommendations for location, format, capacity, merchandise mix and customer segment by solving an optimization model that simultaneously determines said location, format, capacity, merchandise mix and customer segment, the optimization model including $$\max \sum_{i=1}^{N} \{P(S_i) - V_i - L(S_t, S_{i0})\},$$

wherein $P(S_i)$ is a potential demand of i-th store with configuration $S_i$ and wherein $$P(S_i) = \sum_{g \in TA(L_i, F_i, P_i)} \sum_{k \in C_i} \sum_{j \in M_i} D(g, b_k, n_j),$$

$D(g, b_k, n_j)$ is a potential demand of merchandise category j from customer class k in facility g, $TA(L_i, F_i, P_i)$ is a trade area of i-th store, wherein $L_i$ is radius of the trade area determined by format $F_i$ and $P_i$ is total customer capacity, $V_i$ is an existing sales volume of i-th store, and zero for a new store, $L(S_i, S_{i0})$ is an operation cost of transforming i-th store's existing configuration $S_{i0}$ to recommended configuration $S_i$.

19. The program storage device of claim 18, wherein said one or more gaps include:
gap between the number of potential customers and actual customers;
gap between potential demand and actual sales of merchandise;
gap between potential demand of merchandise by customer segment and actual demand of merchandise by customer segment; or
combinations thereof.

* * * * *